United States Patent
Coffman et al.

(10) Patent No.: US 6,286,362 B1
(45) Date of Patent: Sep. 11, 2001

(54) DUAL MODE LEAK DETECTOR

(75) Inventors: John Daniel Coffman, Austin; Jeffrey Gordon Lorge, Round Rock, both of TX (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/282,606

(22) Filed: Mar. 31, 1999

(51) Int. Cl.$^7$ .................................................. G01M 3/20
(52) U.S. Cl. ........................................................ 73/40.7
(58) Field of Search .............................................. 73/40.7

(56) References Cited

U.S. PATENT DOCUMENTS

| | | |
|---|---|---|
| 3,085,198 | 4/1963 | Briggs et al. . |
| 3,800,586 | 4/1974 | Delatorre et al. . |
| 4,409,817 | 10/1983 | Edwards, Jr. . |
| 4,492,110 | 1/1985 | Bergquist ............................ 73/40.7 |
| 4,761,553 | 8/1988 | Juravic, Jr. . |
| 5,365,772 | 11/1994 | Ueda et al. . |
| 5,625,141 * | 4/1997 | Mahoney et al. ................... 73/40.7 |
| 5,703,281 * | 12/1997 | Myneni ................................ 73/40.7 |
| 5,777,209 | 7/1998 | Tien . |
| 5,979,225 * | 11/1999 | Zhou .................................... 73/40.7 |

FOREIGN PATENT DOCUMENTS

| | | | |
|---|---|---|---|
| 56-142436 * | 11/1981 | (JP) | .................................... 73/40.7 |
| 63-36128 * | 2/1988 | (JP) | .................................... 73/40.7 |
| 1132160 * | 12/1984 | (SU) | .................................... 73/40.7 |
| 1430772 * | 10/1988 | (SU) | .................................... 73/40.7 |
| 1693411 * | 11/1991 | (SU) | .................................... 73/40.7 |

* cited by examiner

*Primary Examiner*—Daniel S. Larkin
(74) *Attorney, Agent, or Firm*—Thomason Moser Patterson

(57) ABSTRACT

The present invention generally provides a leak detector having at least two partial pressure analyzers. The leak detector comprises a pumping system, a trace gas detector, and a residual gas analyzer. The leak detector is attachable to a test object, such as a vacuum system, and the pumping system operates to draw a vacuum therein. The residual gas analyzer determines the presence of oxygen, nitrogen, and other components of air in the test object. A trace gas, such as helium, provided to the exterior of the test system is monitored by the trace gas detector which may be a magnetic sector mass spectrometer. The residual gas analyzer and the trace gas detector may be operated simultaneously or independently.

24 Claims, 3 Drawing Sheets

DUAL MODE LEAK DETECTOR

BACKGROUND OF THE INVENTION

1. Field of the Invention

The present invention relates to an apparatus and method for the detection of leaks and qualification of vacuum systems. More specifically, an apparatus and method is provided for detecting gaseous components of air, as well as a trace gas.

2. Background of the Related Art

Vacuum system qualification against leaks is necessary to ensure proper operation of the system. Various methods and apparatus are currently used for leak detection. Typically, vacuum systems and individual components are qualified either by trace gas leak detection or by Rate of Rise (ROR) and/or base pressure ($P_B$) testing or a combination of these methods.

A trace gas leak detector utilizes a Mass Spectrometer Leak Detector (MSLD) capable of detecting a gas, such as helium, in a test object, such as a vacuum system. The MSLD comprises a spectrometer tube to measure the partial pressure of the trace gas in a vacuum system. Electrons produced by a hot filament in the spectrometer tube travel toward a positive grid. In transit, some of the electrons collide with the gas molecules, thereby creating ions. A magnetic field is employed to deflect the various ions according to their mass-to-charge ratio allowing only the desired trace gas ions to pass through the field and arrive at a collector. The trace gas ions then strike the collector and raise the potential of the collector in proportion to their arrival rate. This potential increase is measured by an electrometer amplifier and displayed on the output meter. The readout is proportional to the total pressure in the spectrometer tube. The higher the pressure in the tube, the more trace gas molecules are present, and the more trace gas ions are created.

An exemplary MSLD 10 is shown in FIG. 1 coupled to a test object 11, such as a vacuum chamber. In general, the MSLD 10 consists of a manifold 12 having a series of valves and a manometer 32 disposed therein, a magnetic sector spectrometer tube 14 sensitive to helium (or other trace gas), a high vacuum pump 16, such as a turbomolecular pump, to maintain an adequately low operating pressure in the spectrometer tube 14, a mechanical pump 18 such as a roughing pump, to evacuate the component or system to be tested, a power supply 20, and an output unit 22 comprising an amplifier and readout instrumentation, such as a meter, to monitor an output signal from the spectrometer tube 14. The test object 11 is coupled to an inlet end 24 of the manifold 12 and selectively communicates with either the mechanical pump 18 or the high vacuum pump 16 according to the valve sequencing during operation. A manual shut-off valve 30 is disposed between the test object 11 and the MSLD 10 to selectively isolate the two components from one another.

Initially, the roughing valve 26 is opened and the test object 11 is pumped down by the roughing pump 18. The pressure in the test object 11 is measured by the manometer 32. Once a base pressure is reached in the test object 11, the test valve 28 is opened to provide fluid communication with the high vacuum pump 16, thus allowing gas molecules from the test object 11 to flow into the spectrometer tube 14. A trace gas, such as helium, is then sprayed around the exterior of the test object 11. If vacuum leaks are present, the helium is drawn into the test object 11 at the location of the leaks. The spectrometer tube 14 then measures the partial pressure of the trace gas and generates a signal which is received by the amplifier and displayed on the output meter.

The foregoing apparatus and method is currently accepted in the industry as an excellent leak check tool for isolating leaks. Further, helium leak checks are capable of detecting very small leaks on the order of $10^{-8}$ to $10^{-10}$ sccs. However, helium leak detection is an extremely sensitive technique requiring the technician to apply a calibrated amount of helium, at a specified distance, moving at a specified rate across the unit being tested. A complex test object, such as a typical semiconductor processing cluster tool for example, comprises thousands of sealing surfaces and welds of varying types. Successful helium testing requires uniform testing methods at each location on the cluster tool. Consequently, the accuracy may vary by a factor of ten for a single operator and a factor of twenty to one hundred between different operators. In some cases, the leaks may be missed altogether if the appropriate location is not sprayed with helium.

In order to avoid the inaccuracy of helium leak detection and in an attempt to further automate leak detection, the industry has adopted various very rough methods of gross leak detection. Gross leak detection implies testing techniques adapted merely to indicate the presence of a leak in the device under test without locating the precise location of the leak. Such methods include the use of trace gas environments testing, the Rate of Rise (ROR) method and the $P_B$ (base pressure) method.

A trace gas environment test involves establishing an enclosure around a test object and subjecting the enclosure to a trace gas. Typically, the enclosure is provided using an inflatable bag that is disposed around the test object to seal the object from ambient conditions. A trace gas, such as helium, is then introduced into the bag to create a helium-rich environment around the test object. The test object is then pumped to a sub-atmospheric condition and a trace gas detector is used to monitor the presence of the trace gas in the test object. If the trace gas is detected in the device being tested, a leak is present.

The $P_B$ and ROR methods both use conventional manometers available on a vacuum chamber, such as capacitance manometers and ion gauges, to determine the existence of a leak. Both methods are total pressure tests, i.e., the methods observe the total pressure of the system rather than characterizing the component partial pressures which make up the total pressure.

The $P_B$ method involves pumping a chamber down to determine the lowest achievable pressure which is then checked against an acceptable pass/fail $P_B$ value. If the lowest achievable pressure is less than or equal to the predetermined pass/fail $P_B$ value, the chamber is considered qualified and sufficiently leak free. Conversely, if the lowest achievable pressure is greater than a predetermined pass/fail $P_B$ value, the chamber fails the test and must be reworked to eliminate any leaks.

The ROR method involves pumping a chamber down to a desired base pressure, $P_B$, and then isolating the chamber from the associated pumping system. The internal chamber pressure change is then observed and checked against an acceptable pass/fail rate. If the rate of rise of the chamber is less than the acceptable rate, the chamber is considered qualified. Conversely, if the rate of rise is greater than the acceptable rate, the chamber fails the test and the chamber must be reworked to eliminate leaks.

The ROR method and the $P_B$ method may be used independently or in combination. Which test is most appropriate is dependent on the system under test. For baked systems, either the $P_B$ or the ROR methods are appropriate. For unbaked medium vacuum systems, e.g., in the millitorr regime, the ROR method is most appropriate. A baked system refers to a system which has been outgassed for a period of time to remove contaminants (e.g., water vapor and oxygen) from the internal chamber surfaces. Typically, baking a system involves pumping the system down to a pressure below the vapor pressures of the contaminants and may also involve heating the system to an elevated temperature to enhance the outgassing.

Each of the foregoing gross leak tests are somewhat limited. The trace gas environment test, for example, requires establishing an artificial environment by means of an inflatable bag. The bag is cumbersome and requires time-consuming efforts to ensure that a sufficiently leak-free enclosure has been established. Further, large quantities of a costly trace gas, such as helium, are required to conduct the test. If the initial test confirms the existence of a leak, the bag must be removed while the leak is repaired. Subsequently, the bag must be disposed over the test object again to confirm that the leak has been sealed. The foregoing procedure is repeated until the test object is qualified. Further, the trace gas environment test merely indicates the existence of a leak without identifying the particular location of the leak. Thus, once a leak is found, an operator indiscriminately reworks each of the fittings and sealing surfaces suspected of leaking without knowledge of which areas of the chamber are, in fact, leaking.

The efficacy of both the $P_B$ test and the ROR test is limited because the base pressure and rate of rise in a chamber are dependent on numerous factors including chamber materials and volume, temperature, and, in particular, outgassing from chamber components. During exposure to ambient conditions, the interior chamber surfaces absorb or collect molecules, such as water vapor. Under vacuum conditions, the molecules are desorbed or outgassed and contribute to the overall chamber pressure. A typical manometer is incapable of characterizing the nature of the leak to determine whether the leak is caused by virtual leaks (internal leaks) due to outgassing, for example, or real leaks (external leaks). Therefore, a leak free chamber may exhibit a failing base pressure or rate of rise due to high levels of outgassing. Consequently, the $P_B$/ROR methods are highly insensitive and generally valid only for large leaks, e.g., a leak larger than $10^{-4}$ sccs for a ten liter chamber, wherein the partial pressure due to outgassing is minimal compared to the partial pressure of air from external leaks. In general, the larger the volume of the chamber, the larger the leak must be to be detected. While the sensitivity to the $P_B$/ROR methods may be increased by baking the chamber, baking is a time consuming effort which reduces the throughput of the total system. For example, for a ten liter chamber, baking may require eight hours.

Further, the $P_B$/ROR methods are gross leak detection methods which monitor the total pressure of the system under test and are incapable of identifying the location of specific leaks. A failed $P_B$/ROR test merely indicates the possible existence of a leak somewhere in the system. In order to repair the leak, a localizing method, such as conventional helium detection, is needed to pinpoint the precise location of the leak.

By using the $P_B$/ROR methods in tandem with the more sensitive helium leak check, it is assumed that a higher accuracy rate of leak detection is achieved. Thus, for example, a chamber may be tested by the $P_B$/ROR methods and subsequently undergo a helium leak check. However, the inherent limitations of both the $P_B$/ROR methods and the helium leak check prevent even their combined use from achieving sufficient assurance of vacuum integrity. For example, a chamber which passes a helium test of $10^{-8}$ sccs or better may nevertheless fail a $P_B$/ROR test. This inconsistent result may be due to human error during the helium check and/or high outgassing levels in the chamber indicating a $P_B$/ROR failure. The dual nature of these leak detection methods results in increased costs and has provided impetus to finding alternative solutions to the problems involved in leak detection.

One solution to the disadvantages of conventional leak detection methods is the use of Residual Gas Analyzers (RGAs) with the $P_B$/ROR methods. RGAs, such as quadrupoles, are well known in the industry as partial pressure analyzers. Unlike magnetic sector mass spectrometers, discussed above, RGAs are tunable by the operator to detect multiple gases simultaneously and distinctly. As noted above, the $P_B$/ROR methods merely observe the total pressure of a test object. As such, $P_B$/ROR tests do not characterize the source(s) contributing to the pressure. No differentiation is made between virtual leaks, due to internal sources such as outgassing (due primarily to water), and real leaks, i.e., holes or openings that allow fluid flow from the outside atmosphere into the vacuum environment. RGAs allow operators to characterize the various gases which contribute to the rate of rise and base pressure of the test object by measuring the individual partial pressures of each gas. Thus, the operator may observe the partial pressures of the primary gases found in air, i.e., oxygen and nitrogen, which indicate a real leak, separately from the partial pressure of water vapor due to outgassing. Performing the $P_B$/ROR methods with an RGA can increase the sensitivity of standard $P_B$/ROR leak detection by a factor of roughly one hundred.

In operation, the RGA may be used to measure the partial pressure of the components in air in a vacuum chamber. If unacceptable levels of these components (typically oxygen and/or nitrogen) are detected, a leak is present in the chamber. Subsequently, the RGA is uncoupled from the chamber and the helium MSLD is attached. Helium is then sprayed around the chamber and the helium MSLD measures the partial pressure of helium to pin-point the location of the leak(s).

Although leak testing using an RGA and a helium detector is capable of achieving excellent results, current practice still requires the use of at least two separate components: the RGA and the helium MSLD. The operator is therefore limited to using only one component to the exclusion of the other. Once the initial RGA test determines a leak, the operator must uncouple the RGA and couple the helium MSLD to the test object. After locating one or more leaks, the operator must then uncouple the helium MSLD and reattach the RGA to confirm that no more leaks are present. If some leakage is still detected, the operator must perform the helium leak test again. This cycle is repeated until the test object meets the leak specifications. Such an arrangement results in substantial overhead time and increased costs of testing.

Consequently, one important objective of new leak detection methods and apparatus is automation, i.e., to make the techniques less operator dependent and therefore less prone to operator error. The preferred technique would combine the sensitivity of trace gas leak detection using a MSLD and the simplicity and operator independence of the ROR method. It has been suggested to use a conventional RGA, such as a quadrupole, for helium detection in place of a magnetic sector mass spectrometer tubes. Because quadrupole RGAs are tunable by an operator to detect numerous gases according to atomic mass units (amu), an RGA could be tuned to a trace gas, such as helium. However, trace gas detection requires a high level of sensitivity in order to detect small leaks. Typical quadrupole RGAs are only capable of detecting helium leaks larger than $10^{-7}$ sccs in unbaked systems. A preferred detecting apparatus is sensitive to leaks larger than $10^{-9}$ to $10^{-10}$ sccs in unbaked systems.

Therefore, there remains a need for a method and apparatus for automating leak testing of vacuum systems using a rate of rise and/or base pressure method and a trace gas detector in combination. Preferably, the method and apparatus would allow selection of independent or simultaneous rate of rise testing and trace gas detection with a high degree of sensitivity.

SUMMARY OF THE INVENTION

The present invention generally provides an apparatus and method for leak detection. In one embodiment, a leak detector is provided for detection of a trace gas and the gaseous components of air. The leak detector comprises a manifold and a pair of partial pressure analyzers. A first and a second partial pressure analyzer are connected to the manifold to allow fluid communication therewith. A pumping system comprising one or more pumps is fluidly coupled to the manifold to provide a vacuum condition therein. Valves are disposed between the first and second analyzers to selectively communicate the manifold, analyzers, and pumps. A control panel comprising a controller and an output display is coupled to the valves, analyzers, and pumps to supply a signal thereto. The leak detector is attachable to a test object at a test port formed in the manifold.

In another embodiment, a leak detector is provided for detection of a trace gas and the gaseous components of air. The leak detector comprises a manifold and a pair of partial pressure analyzers coupled thereto. A first partial pressure analyzer is a magnetic sector mass spectrometer tuned to detect a trace gas. A second partial pressure analyzer is a residual gas analyzer, such as a quadrupole, capable of detecting two or more gases. A pumping system comprising one or more pumps is fluidly coupled to the manifold to provide a vacuum condition therein. Valves are disposed between the first and second analyzers to selectively communicate the manifold, analyzers, and pumps. A control panel comprising a controller and an output display is coupled to the valves, analyzers, and pumps to supply a signal thereto. The leak detector is attachable to a test object at a test port formed in the manifold.

In yet another embodiment, a method of detecting a leak is provided. The method comprises coupling a first partial pressure analyzer and a second partial pressure analyzer to a test object. The test object is evacuated and the first partial pressure analyzer is communicated with the test object. One or more partial pressures are monitored by the first partial pressure analyzer. A trace gas is then administered to the outer surface of the test object and the second partial pressure analyzer is communicated with the test object. A partial pressure of the trace gas is monitored by the second partial pressure analyzer.

In yet another embodiment, a method of detecting a leak using ambient gases is provided. A trace gas test, a rate of rise test or a base pressure test involves coupling a residual gas analyzer, a trace gas detector, and a pumping system to a test object and pumping the test object to a vacuum condition. The residual gas analyzer is then used to monitor the presence of one or more components of air in the test object. For a ROR test, the rate of rise of the partial pressures of the one or more components of air are observed and compared against predetermined pass/fail values. For a $P_b$ test, the lowest achievable pressure of each of the one or more components of air is observed and compared against a pass/fail value. Alternatively or additionally, a trace gas test may be performed using the trace gas detector. The trace gas test involves selectively delivering a trace gas, such as helium, to the outer surface of the test object after pumping the test object to a vacuum condition. The trace gas detector, such as a magnetic sector leak detector, is communicated with the test object to monitor the presence of the trace gas in the test object.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

In general, the present invention provides a method and apparatus capable of detecting and monitoring the levels of a trace gas and atmospheric gases in a vacuum system. A leak detecting apparatus is provided having two or more partial pressure analyzers coupled to a common manifold. Preferably, a magnetic sector mass spectrometer leak detector is coupled to the manifold to detect a trace gas in the vacuum system. A residual gas analyzer is coupled to the manifold to determine the presence of the gaseous components of air in the vacuum system. The mass spectrometer leak detector and the residual gas analyzer may be operated simultaneously or independently.

Figure 2:
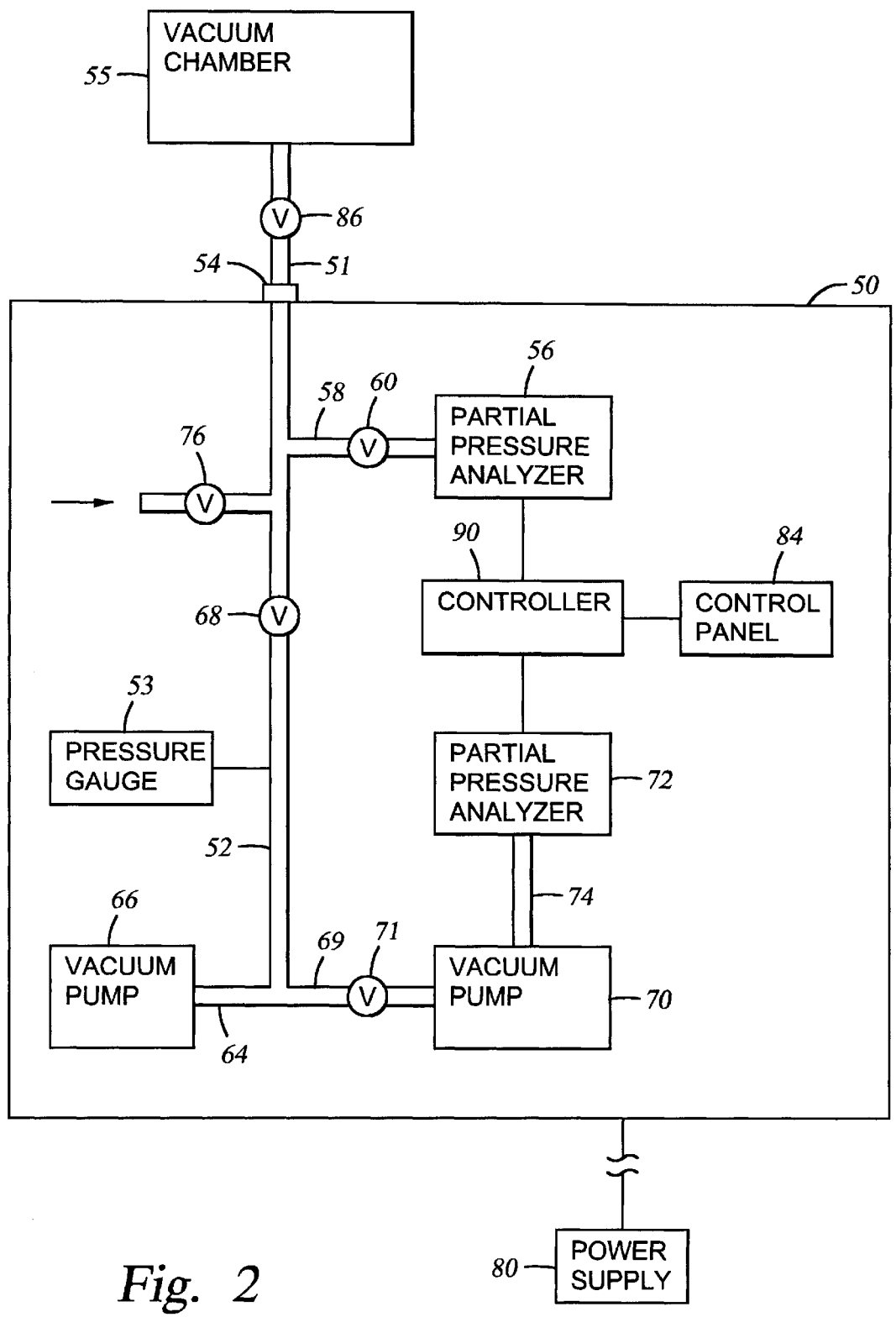
FIG. 2 is a schematic view of a leak detector of the present invention.

FIG. 2 is a schematic representation of a leak detector of the present invention. The leak detector 50 is shown coupled to a pipe 51 of a test object such as a vacuum chamber 55. A manual shut-off valve 86 is disposed in pipe 51 to selectively isolate the leak detector 50 from the vacuum chamber 55.

The leak detector 50 comprises a manifold 52 having an inlet port 54 at one end detachably connected to the test object. A partial pressure analyzer 56 is coupled to the manifold 52 via a pipe 58. A valve 60 is disposed in the pipe 58 and selectively communicates the partial pressure analyzer 56 with the manifold 52 during operation. Preferably, the valve 60 is a large conductance two-position valve, such as an electromagnetic block valve available from Varian.

The partial pressure analyzer 56 may be any commercially available residual gas analyzer (RGA) capable of detecting the components of air and, in particular, oxygen (thirty-two atomic mass units) and nitrogen (twenty-eight atomic mass units). Because the operating pressure of the analyzer 56 establishes a limit to its operation, a high operating pressure is preferred so that the analyzer 56 may be used in broader pressure regimes. Preferably, the analyzer 56 is operable at pressures of $10^{-3}$ Torr or greater. However, analyzers having operating pressures lower than $10^{-3}$ Torr may also be used. Additionally, the partial pressure analyzer 56 is also preferably capable of detecting mass ranges of zero (0) to one hundred (100) atomic mass units (amu) and most preferably one (1) to forty (40) amu. One RGA which may be used to advantage is the Micropole™ from Ferran Scientific, Inc.

At a second end, the manifold 52 tees and extends in opposite directions along a pair of conduits 64, 69. A first conduit 64 is coupled to a first vacuum pump 66, such as a commercially available roughing pump. The specifications of the vacuum pump 66, e.g., throughput, are primarily determined by the operating pressure of the partial pressure analyzer 56. As mentioned earlier, the partial pressure analyzer 56 is preferably operable at pressures in the millitorr regime ($10^{-3}$ Torr) or higher. A roughing pump valve 68 is disposed along the manifold 52 between the roughing pump 66 and the inlet port 54. The valve 68 is preferably a large conductance two-position valve, such as an electromagnetic block valve available from Varian, which selectively opens and closes to communicate the vacuum chamber 55 with the roughing pump 66. A pressure gauge 53, such as a capacitance manometer, is disposed in the manifold 52 downstream of the valve 68 to monitor the pressure in the manifold 52.

A second conduit 69 is coupled to a second vacuum pump 70 and has a valve 71 disposed therein. The valve 71 is preferably a two-position valve, such as a large conductance two-position valve and/or an electromagnetic block valve available from varian to allow selective communication between the manifold 52 and second vacuum pump 70.

A second partial pressure analyzer 72 is coupled to the second vacuum pump 70 via a diffusion pipe 74. Preferably, the second partial pressure analyzer 72 comprises a magnetic sector mass spectrometer and is factory tuned to detect a trace gas, such as helium, neon, and argon among other gases. Further, the second partial pressure analyzer 72 is preferably capable of detecting leaks larger than $10^{-10}$ sccs. Two magnetic sector mass spectrometers which may be used to advantage are the UL500 available from Leybold and the 947D available from Varian.

The specifications of the second vacuum pump 70, such as throughput, are determined primarily by the operating pressure of the second partial pressure analyzer 72. Preferably, the second vacuum pump 70 is a high or ultra high vacuum pump, such as a turbomolecular pump, capable of achieving a vacuum condition of at least $10^{-6}$ Torr.

As shown in FIG. 2, a vent valve 76 is disposed along the manifold 52. The vent valve 76 may be opened to relieve the pressure differential between ambient conditions and the manifold 52. The vent valve 76 is preferably any of numerous commercially available valves such as an electromagnetic block valve available from Varian.

The operation of the leak detector 50 is controlled by a controller 90. The controller 90 is coupled to a control panel 84 and the leak detector components, i.e., the analyzers 56, 72, pumps 66, 70, and valves 60, 68, 71, 76, to transmit signals thereto and receive signals therefrom. Although not shown in FIG. 2, the controller 90 is also coupled to the other leak detector components, i.e., pumps 66, 70 and valves 60, 68, 71, 76. The control panel 84 preferably includes a display panel and an input device, including one or more push-buttons to initiate the operation of the leak detector 50. The operation of leak detector 50 is initiated by an operator from the control panel 84 by depressing a push-button on the control panel 84. Once initiated, the pumps and valves are automatically operated by the controller 90.

Preferably, the control panel 84 can selectively operate either analyzer 56, 72 by directing a current thereto via the controller 90. Thus, the control panel 84 allows either independent or simultaneous operation of the analyzers 56, 72. The input device allows an operator to select the particular gases to be monitored by the first partial pressure analyzer 56. During operation, the readings indicating the leak rates of the gases being monitored are displayed on the display panel. Separate readings are displayed for each analyzer 56, 72. Alternatively, the control panel 84 could indicate only that leaks of a predetermined magnitude, as defined by the operator, are present in the vacuum system thereby prompting the operator to continue testing. In such an embodiment, the operator inputs the highest acceptable leak rates to be detected by each analyzer 56, 72. Each analyzer 56, 72 is then operated to produce a pass or fail value which is transmitted to the control panel 84 and displayed on the display panel.

In another embodiment, the control panel 84 is a separate component from the leak detector 50, such as a computer having conventional software support for gas analyzation. Signal transmitting devices, such as RS-232 cables may be used to couple the control panel 84 to the computer and allow the input and display of information.

FIG. 2 shows a power supply 80 connected to the leak detector 50 to supply a voltage and current thereto. Preferably, the power supply 80 is a conventional source of power, such as a 120V or 240V wall outlet.

Figure 1:
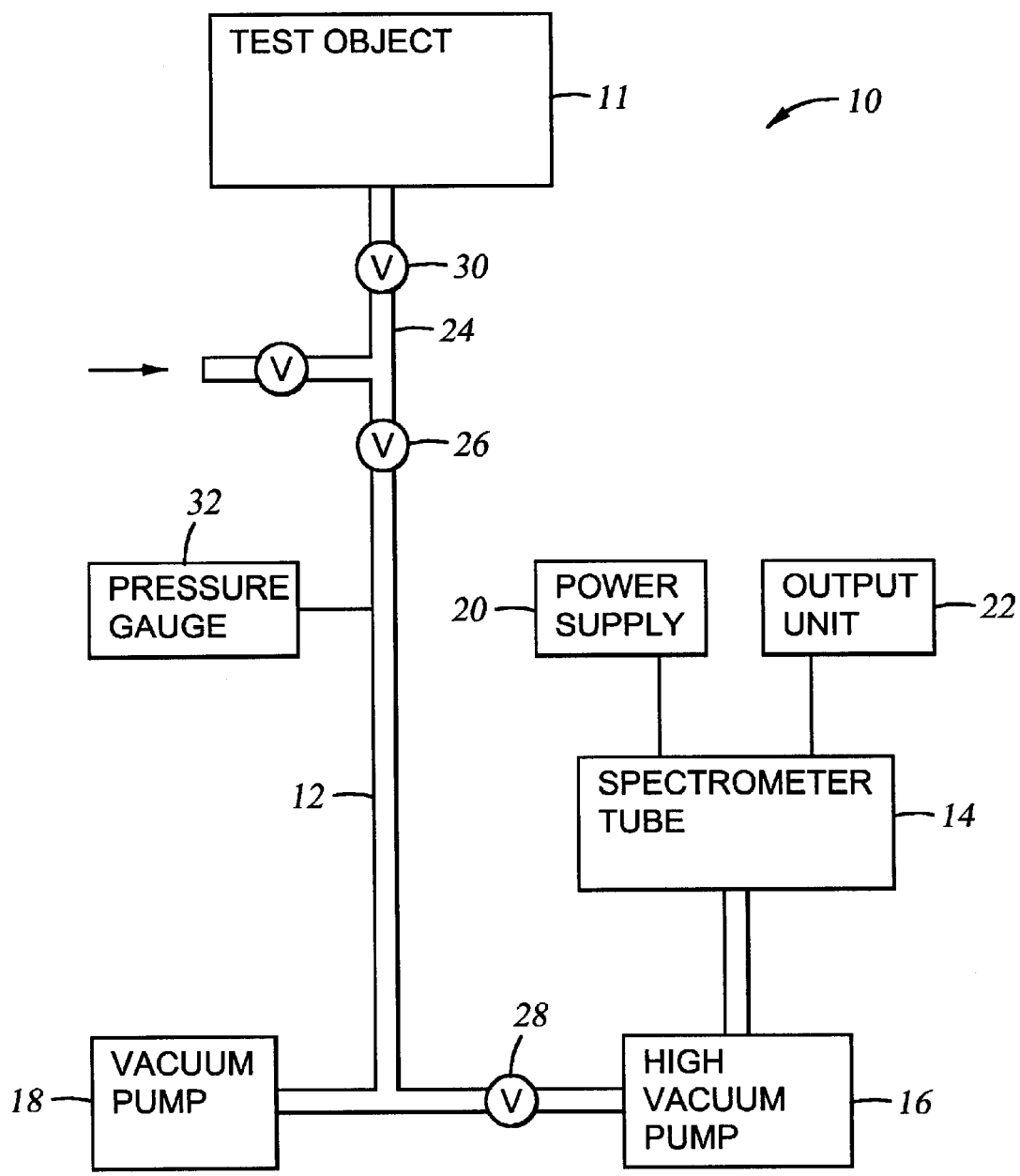
FIG. 1 is a schematic view of a prior art leak detector.

Comparison of FIGS. 1 and 2 reveals that the present invention may be used to modify existing leak detectors. The vacuum system of conventional trace gas detectors, such as helium detectors, can be retrofitted to accommodate an RGA, such as a quadrupole, in the manner described above with reference to FIG. 2. The resulting device eliminates the need for separate components which must be alternatively coupled to a test port of a vacuum chamber. A single component is then usable for performing both trace gas testing as well as detection of oxygen, nitrogen, and other components of air. Operation of the trace gas detector and the RGA may be performed simultaneously or alternatively according to the selection of an operator.

Figure 3:
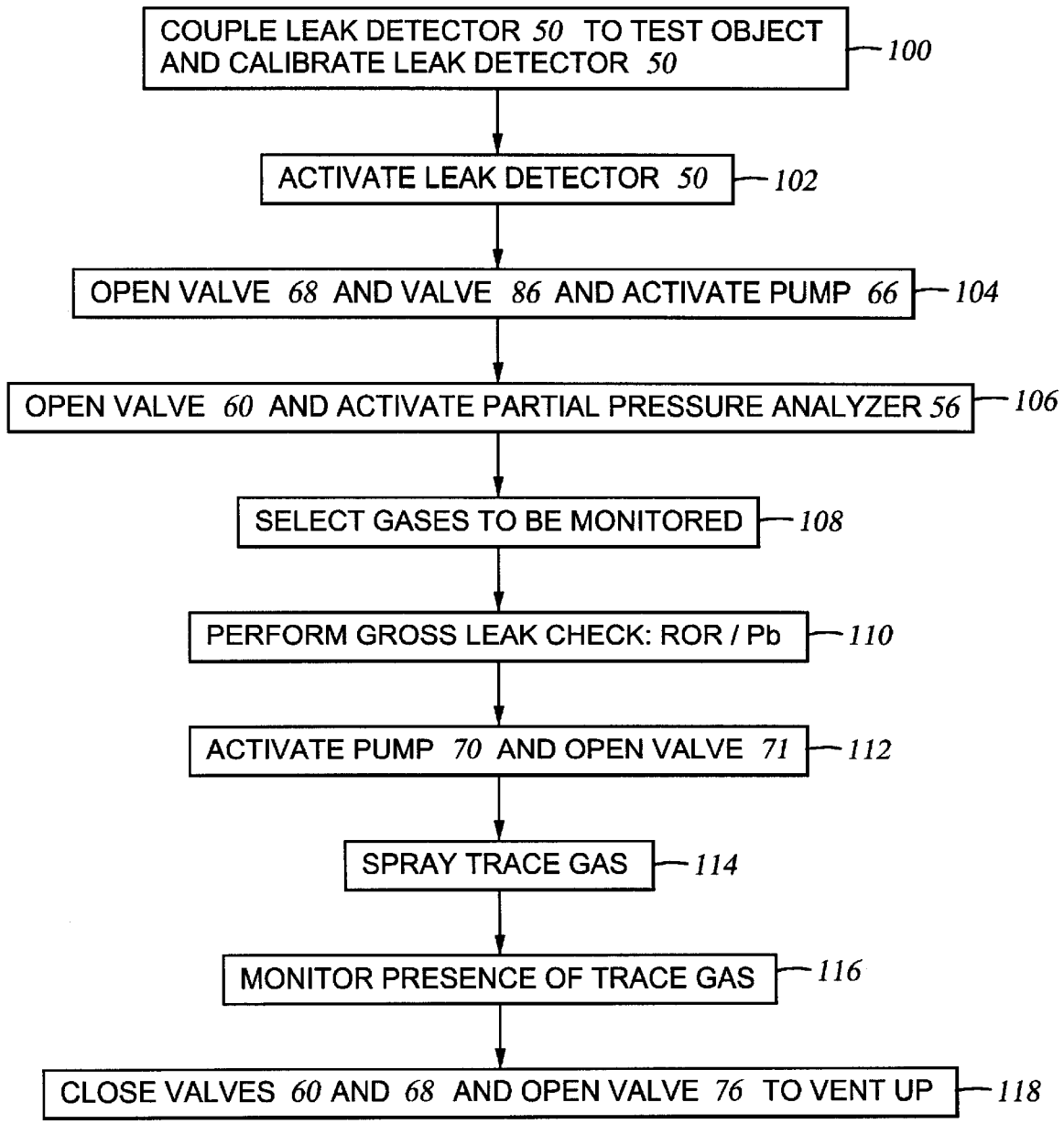
FIG. 3 is flowchart showing one method of operation of the present invention.

One method of operation is shown in FIG. 3. Reference is made simultaneously to FIG. 2. In step 100, the leak detector 50 is coupled to a test object, such as the vacuum chamber 55, at the test port 54 and may then be calibrated. In step 102, the operator initiates operation of the leak detector 50 by depressing a push-button disposed on the control panel 84. In step 104, the vacuum pump 66 is activated and the valves 68 and 86 are opened to allow communication between the vacuum chamber 55 and the vacuum pump 66. After a period of time, the vacuum chamber 55 reaches a first pressure and gas molecules from the vacuum chamber 55 are diffused within the manifold 52. In step 106, the valve 60 is opened and the first partial pressure analyzer 56 is activated. Thus, a portion of the gas molecules from the manifold 52 flow into the first partial pressure analyzer 56 and are detected. The initial pumping time prior to opening valve 60 is determined by the operating pressure of the first partial pressure analyzer 56, as discussed above. Step 108 indicates the selection of gases to be monitored by the first partial pressure analyzer 56. The gases are selected by the operator and input to the control panel 84. Preferably, the selected gases include at least oxygen or other components of air, such as nitrogen. As described above, characterization and observation of the components of air in the chamber achieves a higher level of accuracy in determining the presence of a leak. The first partial pressure analyzer allows the operator to disregard pressure fluctuations due to virtual leaks, e.g., outgassing, and identify real leaks. The operator performs a gross leak check using the first partial pressure analyzer 56, as indicated by step 110, by observing the base pressures and/or the rates of rise of the selected gases. A base pressure test is performed by pumping the vacuum chamber 55 to a base pressure and then, during continued pumping, observing the partial pressures of the selected gases. A rate of rise (ROR) test is performed by pumping the vacuum chamber 55 to a base pressure and then isolating the first vacuum pump 66 from the vacuum chamber 55 by sealing the valve 68. The display of the control panel 84 may then be observed for the rates of rise of the selected gases. If a passing rate of rise/base pressure is observed, the chamber 55 may be considered sufficiently leak free. However, in order to further qualify the chamber to a higher degree of certainty, the operator may perform a trace gas check. Further, if a failing rate of rise is observed the chamber is determined to have an unacceptably large leak and a trace gas test is performed as indicated by steps 112–116.

In step 112, the second vacuum pump 70 is activated and the valve 71 is opened. The vacuum chamber 55 is then pumped down to a second pressure lower than the first pressure. Preferably, the pressure is less than $10^{-3}$ Torr in order to ensure molecular flow of the gas molecules in the manifold 52 and the diffusion pipe 74, thereby allowing a portion of the gas molecules to flow into the second partial pressure analyzer 72. In step 114, a trace gas, such as helium is sprayed around the outer surface of the vacuum chamber 55 and, in particular, adjacent the sealing surfaces. In step 116, the presence of the trace gas in the chamber 55 is monitored on the control panel 84. A positive reading indicates that the second partial pressure analyzer 72 detects helium molecules and that a leak exists at the point where the helium is being administered. The discovered leaks are then repaired and preferably the vacuum chamber 55 is rechecked for leakage to ensure the chamber integrity. At the completion of the testing, the valves 60 and 68 are closed, the first partial pressure analyzer 56 is turned off, and vent valve 76 is opened to return the leak detector 50 to equilibrium with ambient conditions, as indicated by step 118.

In general, the operation of the leak detector 50 is determined by the particular method of leak testing used. The foregoing method is merely illustrative and is not to be understood as limiting the scope of the present invention. Various methods may be used and the particular method of leak checking is determined by the operator. For example, the trace gas leak test indicated by steps 110–114 may be performed simultaneously with or prior to the rate of rise/base pressure tests indicated by steps 100–108. Where the trace gas leak test and the rise/base pressure tests are performed simultaneously, the vacuum chamber 55 is first pumped to an operating pressure of the second partial pressure analyzer 72. Both analyzers 56, 72 are then activated. The second partial pressure analyzer 72 is used to monitor the presence of a trace gas while the first partial pressure analyzer 56 monitors the rate of rise/base pressure of air by detecting oxygen, nitrogen, or other components of air. As the leaks isolated by the second partial pressure analyzer 72 are repaired, the operator can observe an improving rate of rise/base pressure on the control panel 84 as determined by the first partial pressure analyzer 56. The improving rate of rise/base pressure indicates that the operator has both isolated and successfully repaired a leak, thereby limiting the inflow of air into the vacuum chamber 55 from the environment. As each leak is successively repaired, the rate of rise/base pressure is further improved until a passing rate of rise/base pressure is achieved. Thus, the leak detector of the present invention provides a highly efficient and effective leak detection apparatus and method not available in the prior art.

While the foregoing description is provided with reference to the leak detector 50 shown in FIG. 2, the present invention may be generally described according to a method of operation. In general, the invention facilitates a rate of rise test, a base pressure test, and/or a trace gas test. A rate of rise or base pressure test involves coupling a residual gas analyzer, a trace gas detector, and a pumping system to a test object and pumping the test object to a vacuum condition. The residual gas analyzer is then used to monitor the presence of one or more components of air in the test object. For a ROR test, the rate of rise of the partial pressures of the one or more components of air are observed and compared against predetermined pass/fail values. For a $P_b$ test, the lowest achievable pressure of each of the one or more components of air is observed and compared against a pass/fail value. The use of the residual gas analyzer allows characterization of the air into the one or more components, thereby, allowing an operator to observe ambient gases (indicating a leak) separately from outgasses. Alternatively or additionally, a trace gas test may be performed using the trace gas detector. The trace gas test involves supplying a trace gas, such as helium, to the outer surface of the test object after pumping the test object to a vacuum condition. The trace gas detector, such as a magnetic sector leak detector, is communicated with the test object to monitor the presence of the trace gas in the test object. Thus, the present invention provides a method and apparatus for monitoring the presence of air and/or a trace gas in a test object using a single integrated device.

One other method which may use the present invention to advantage involving trace gas testing, rate of rise testing and base pressure testing, is disclosed in co-pending application Ser. No. 08/918,480 entitled, "Diagnosis Process of Vacuum Failure in a Vacuum Chamber" which is incorporated herein by reference in its entirety. Further, although preferably each of the tests are performed, each may be performed exclusively of the others. A person skilled in the art will recognize other embodiments and alternatives.

While foregoing is directed to the preferred embodiment of the present invention, other and further embodiments of the invention may be devised without departing from the basic scope thereof, and the scope thereof is determined by the claims that follow.

What is claimed is:

1. A leak detecting apparatus, comprising:
    a manifold;
    a first pump in communication with the manifold, the first pump being configured to pump the manifold to a first pressure;
    a first gas detector for detecting a partial pressure of a first gas coupled to the manifold;
    a second pump in communication with the manifold, wherein the second pump is configured to pump the manifold to a second pressure, the second pressure being lower than the first pressure; and
    a second gas detector in communication with the second pump for detecting the partial pressures of a second gas coupled to the manifold.

2. The apparatus of claim 1, wherein the second gas is selected from the group comprising helium, neon, and argon.

3. The apparatus of claim 1, wherein the first gas includes air.

4. The apparatus of claim 1, wherein the second gas is selected from the group comprising oxygen, nitrogen, argon, and water vapor, and any combination thereof.

5. The apparatus of claim 1, wherein the first gas detector is a residual gas analyzer and the second gas detector is a magnetic sector mass spectrometer.

6. The apparatus of claim 5, wherein the residual gas analyzer comprises a quadrupole gas detector.

7. An apparatus for detecting a leak in a vacuum system, comprising:
  (a) a manifold;
  (b) a pumping system coupled to the manifold, the pumping system including a first pump configured to pump the vacuum system to a first pressure and a second pump configured to pump the vacuum system to a second pressure;
  (c) a first gas detector fluidly coupled to the manifold; and
  (d) a second gas detector fluidly coupled to the second pump.

8. The apparatus of claim 7, further comprising a controller coupled to the pumping system, the first gas detector, and the second gas detector.

9. The apparatus of claim 7, further comprising:
  a first valve disposed between the manifold and the first gas detector;
  a second valve disposed along the manifold between the first valve and the first pump; and
  a third valve disposed in the manifold between the second valve and the second pump.

10. The apparatus of claim 7, wherein the first gas detector is a residual gas analyzer and the second gas detector is a magnetic sector mass spectrometer.

11. The apparatus of claim 7, wherein the residual gas analyzer comprises a quadrupole gas detector.

12. A method of detecting a leak in a vacuum system:
  coupling a leak detecting apparatus to the vacuum system, the leak detecting apparatus comprising a manifold, a first gas detector coupled to the manifold, and a second gas detector coupled to the manifold;
  pumping the manifold with a first pump to a first pressure;
  communicating the first gas detector with the vacuum system via the manifold;
  pumping the manifold with a second pump to a second pressure, the second pressure being lower than the first pressure; and
  communicating the second gas detector with the vacuum system via the manifold.

13. The method of claim 12, wherein the first gas detector monitors the presence of air.

14. The method of claim 12, wherein the second gas detector monitors the presence of a trace gas.

15. The method of claim 12, further comprising supplying a trace gas to the exterior of the vacuum system.

16. A method of detecting a leak in a vacuum system:
  pumping a manifold in communication with the vacuum system to a first vacuum condition with a first pumping system;
  monitoring the presence of one or more components of air using a residual gas analyzer in communication with the manifold;
  pumping the manifold to a second vacuum condition with a second pumping system; and
  monitoring the presence of a trace gas in the manifold with a trace gas detector, the trace gas detector being in communication with the second pumping system.

17. The method of claim 16, further comprising supplying a trace gas to an outer surface of the vacuum system.

18. The method of claim 16, wherein monitoring using the residual gas analyzer comprises monitoring the presence of one or more of oxygen, argon, nitrogen, and neon.

19. The method of claim 16, wherein monitoring using the residual gas analyzer comprises monitoring the pressure rate of rise of the one or more components of air.

20. The method of claim 16, wherein monitoring using the residual gas analyzer comprises monitoring a base pressure of the one or more components of air.

21. The method of claim 16, further comprising positioning an integrated detecting apparatus in communication with the vacuum system.

22. A leak detecting apparatus, comprising:
  a manifold;
  first pumping means in communication with the manifold for pumping the manifold to a first pressure;
  first gas detector means for detecting a partial pressure of a first gas coupled to the manifold;
  second pumping means in communication with the manifold for pumping the manifold to a second pressure, the second pressure being lower than the first pressure; and
  second gas detector means in communication with the second pump for detecting partial pressures of a second gas coupled to the manifold.

23. A method of detecting a leak in a vacuum system:
  coupling a leak detecting apparatus to the vacuum system, the leak detecting apparatus including a manifold, means for detecting a first gas coupled to the manifold, and means for detecting a second gas coupled to the manifold;
  pumping the manifold with a first pump to a first pressure;
  communicating the means for detecting a first gas with the vacuum system via the manifold;
  pumping the manifold with a second pump to a second pressure, the second pressure being lower than the first pressure; and
  communicating the means for detecting a second gas with the vacuum system via the manifold.

24. A method of detecting a leak in a vacuum system:
  pumping a manifold in communication with the vacuum system to a first vacuum condition with a first means for pumping;
  monitoring the presence of one or more components of air using means for analyzing a residual gas in communication with the manifold;
  pumping the manifold to a second vacuum condition with a second means for pumping; and
  monitoring the presence of a trace gas in the manifold with a means for detecting a trace gas in communication with the second means for pumping.

* * * * *

UNITED STATES PATENT AND TRADEMARK OFFICE
CERTIFICATE OF CORRECTION

PATENT NO.    : 6,286,362 B1                                   Page 1 of 1
DATED         : September 11, 2001
INVENTOR(S)   : Coffman et al.

It is certified that error appears in the above-identified patent and that said Letters Patent is hereby corrected as shown below:

Column 1,
Line 8, please delete "," after -- air --.

Column 7,
Line 34, please replace "varian" with -- Varian --.

Column 11,
Line 38, please replace "7" with -- 10 --.

Signed and Sealed this

Second Day of April, 2002

Attest:

JAMES E. ROGAN
Attesting Officer    Director of the United States Patent and Trademark Office